United States Patent Office 3,556,970
Patented Jan. 19, 1971

3,556,970
TREATMENT OF EFFLUENTS BY THE REVERSE OSMOSIS PROCESS
John F. Wallace, Didcot, and John G. Ransome, Abingdon, England, assignors to Pressed Steel Fisher Limited, Cowley, Oxford, England, a corporation of Great Britain
Filed Mar. 19, 1968, Ser. No. 714,242
Claims priority, application Great Britain, Mar. 27, 1967, 13,431/67
Int. Cl. B01k 5/00; C23b 13/00
U.S. Cl. 204—181                2 Claims

ABSTRACT OF THE DISCLOSURE

A process for the treatment of solutions and mixtures, which become diluted by rinse water in the course of treatment, such as a water-borne paint, used to coat an article, diluted juices particularly fruit juices or diluted wood pulp in which the contaminated rinse water is conveyed from a rinsing station directly back to a treatment tank and the thus diluted contents of the treatment tank are passed as an effluent under pressure through a reverse osmosis unit to separate the effluent into parts of high and low concentration of the original contents of the treatment tank.

---

Figure 1:
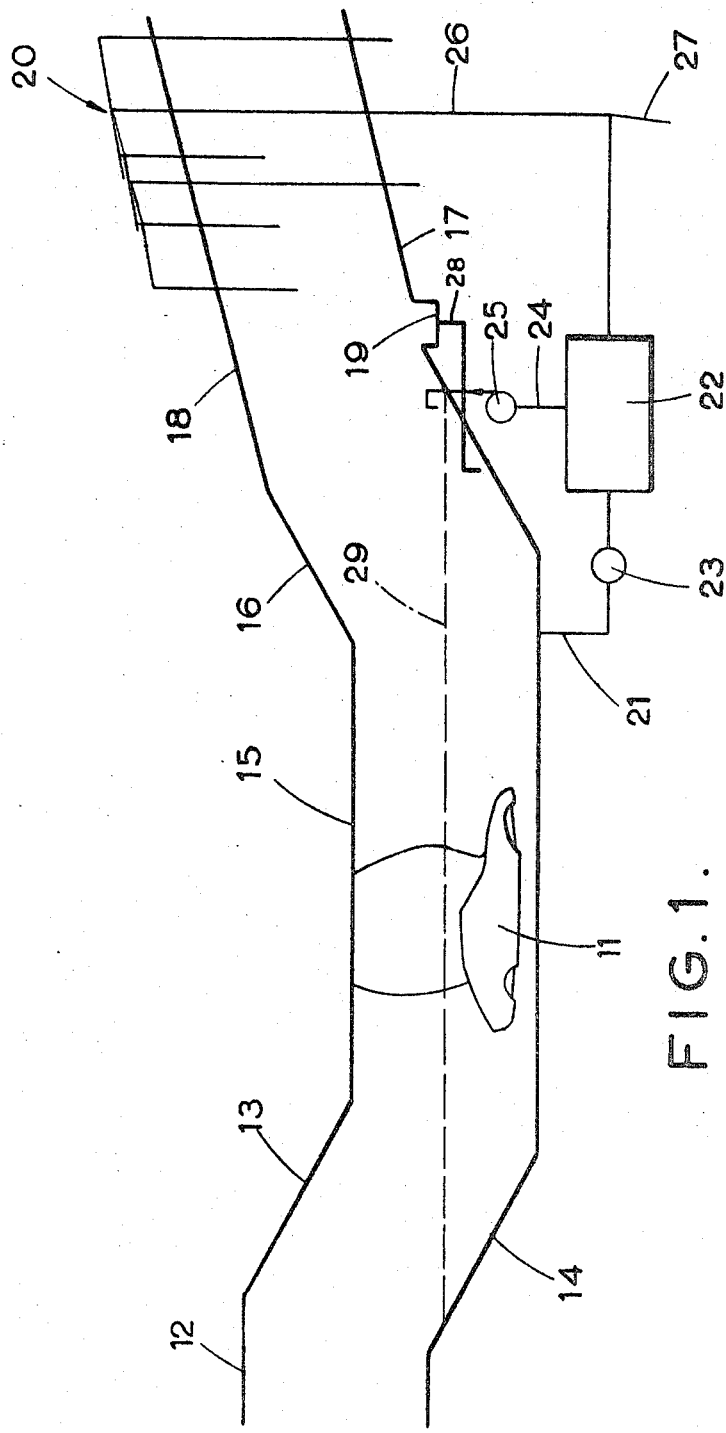

Many processing plants are in use today, involving the use of mixtures and solutions which, during the course of treatment, become diluted. One such example, is the coating of articles with a water-borne paint by an electrophoretic process, wherein the article after coating is rinsed to remove any residual coating medium and any resin or pigment which is only partially coagulated. In this example, the rinse water contains pigments and resins which it is most desirable to recover for further use. Other examples of processing plants are the treatment of wood pulp, the treatment of radioactive waste and the treatment of juices e.g. fruit juices.

Referring particularly to the process for coating articles with a water-borne paint by electrophoresis it is known to treat effluents from the process, i.e. the pigment and resin contaminated rinse water, by the reverse osmosis process. In one such process effluents from a painting plant are brought into contact with a semi-permeable membrane which is porous to water molecules but impermeable to large molecules, the effluent being pressurised to cause the water in the effluent to pass through the membrane. This treatment provides for the disposal of the effluent and enables a concentrated solution of resins and pigments to be recovered for further use. In this prior treatment process, where the rinse operation is performed over the coating tank, the effect of the rinse water on the concentration of pigment and resin is very small and it is quite a simple matter to re-concentrate the contents of the tank; where however, the rinsing operation is carried out at a position remote from the coating tank, as is frequently the case, it is essential, in order to effect treatment of the tank contents to maintain the pigment and resin concentration and to hold the pH value at the desired level, that the rinse water containing resins and pigments be conveyed quickly back to the coating tank, thereby avoiding the danger of instability of the pigment and resin content so that the contents of the tank can then be treated effectively by the reverse osmosis process.

Similar conditions are found in other processes where it is desirable to maintain certain related conditions in the treatment tank for the most efficient and economical operation.

The object of this invention is to provide a process to treat effluents from processing plants, particularly such plants using the electrophoretic treatment process, which avoids waste and which ensures the substantial complete recovery of materials used in the process.

According to the invention rinse water from a processing plant subsequent to the rinsing operation is conveyed directly to the treatment tank and the medium now in the tank is passed under pressure through a reverse osmosis unit whence that part of the medium having a high concentration of materials is returned to the treatment tank and that part of low concentration is led to waste, for use in a further process or for further recirculation.

Preferably rinse water from a painting tank containing some pigments and resins is returned directly to the coating tank (or to a storage tank containing the coating medium) and the medium now in the coating tank is passed under pressure through a reverse osmosis unit, whence that part of the effluent therefrom having a high concentration of resins and pigments is returned to the coating (or storage tank) and that part being water or having a low concentration of resins and pigments is led to waste or to be used in a further process.

The invention is illustrated in the accompanying drawings which are simple schematic representations of two forms of painting tank and effluent treatment plant.

Acocrding to FIG. 1, an article to be painted, shown for example as a vehicle body 11, is suspended from a conveyor rail 12, having a downturned portion 13 to convey the article into the tank 14, along which the body is carried by the rail 15 whence it is removed by the rail 16 continuing upwardly as at 18 to a rinse station 20.

A sump 19 collects effluent from the base 17, in which sump and frothing of the effluent settles, before it is conveyed over pipe 28 to the tank 14.

The tank is filled with paint to the level 29.

When the article leaves the tank 14 it is water sprayed at station 20 and the rinse water now containing pigments and resins is carried back to the bath along the base 17 and sump 19.

An outlet pipe 21 from the base of the tank disposed towards its exit end, conveys paint and rinsce to a reverse osmosis unit 22. One example of reverse osmosis unit suitable for this purpose comprises a semi-permeable member of copper ferrocyanide formed in the walls of an unglazed reinforced porous porcelain pot. A second example, comprises a membrane of cellulose acetate and magnesium perchlorate dissolved in dioxan, the membrane being formed into a tube and inserted into a porous tube of glass fibre, the whole being encased in a perforated stainless steel tube. Effluent having a high concentration of resins and pigments is returned directly to the tank over pipe 24 by the pump 25 whilst water, or effluent having a low concentration is conveyed by pipe 26 to the rinse station 20 or by pipe 27 to waste or for use in a further process.

Figure 2:
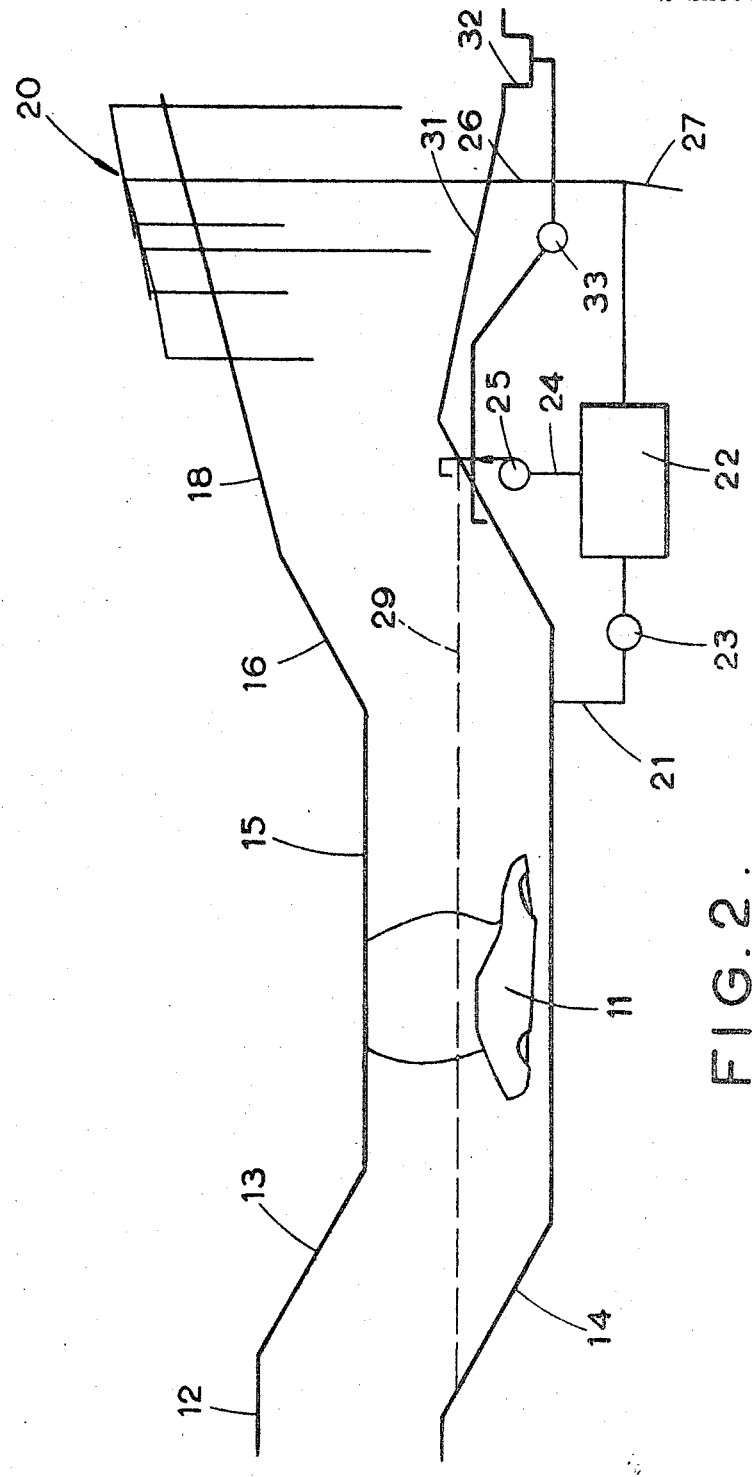

In FIG. 2 the arrangement is similar, but in this case, the exit from the tank 14 is sloped downwardly, as at 31, to lead to a sump 32 whence the effluent is pumped back to the tank 14, by the pump 33.

The process may be carried out continuously or intermittently and whilst the coating tank is in use or is idle.

What we claim is:

1. A process for the treatment of effluent from a rinsing station of a plant for the electro-deposition of a water-borne coating medium which includes the steps of:
   (a) coating an article in a coating tank,
   (b) moving the coated article to a rinsing station remote from the coating tank,
   (c) water rinsing said coated article at said rinsing station,
   (d) conveying rinse water effluent from said rinsing station back to said coating tank, (e) treating the contents of the coating tank by a reverse osmosis unit to separate the said contents into parts of relatively high and low concentration of water-borne coating medium, (f) returning said high concentration part to said coating tank.

2. A process according to claim 1, wherein the said low concentration part is recirculated through the rinsing station.

References Cited

Journal of Paint Technology, vol. 38 (Feb., 1966), No. 493, pages 85, 103 and 104.

HOWARD S. WILLIAMS, Primary Examiner

U.S. Cl. X.R.

204—300